United States Patent [19]

Wechsler et al.

[11] Patent Number: 4,843,590
[45] Date of Patent: Jun. 27, 1989

[54] HISTORY STACK

[75] Inventors: Susan L. Wechsler; Eric A. Evett; Pamela F. Raby, all of Corvallis, Oreg.

[73] Assignee: Hewlett-Packard Company, Palo Alto, Calif.

[21] Appl. No.: 868,405

[22] Filed: May 29, 1986

[51] Int. Cl.$^4$ .......................... G06F 7/00; G06F 15/02
[52] U.S. Cl. .................................. 364/900; 364/920.0; 364/927.66
[58] Field of Search ... 364/200 MS File, 900 MS File, 364/300, 706

[56] References Cited

U.S. PATENT DOCUMENTS

| | | | |
|---|---|---|---|
| 3,548,384 | 12/1970 | Barton et al. | 364/200 |
| 3,878,513 | 4/1975 | Werner | 364/200 |
| 3,889,243 | 6/1975 | Drimak | 364/200 |
| 4,075,689 | 2/1978 | Berkling | 364/200 |
| 4,521,868 | 6/1985 | Caldwell et al. | 364/753 |
| 4,528,638 | 7/1985 | Hatta et al. | 364/464 |
| 4,530,068 | 7/1985 | Nakanishi et al. | 364/706 |
| 4,636,970 | 1/1987 | Morino et al. | 364/706 |
| 4,680,725 | 7/1987 | Lapeyre | 364/709 |
| 4,695,983 | 9/1981 | Oda et al. | 364/709 |
| 4,698,784 | 10/1987 | Abell | 364/706 |
| 4,718,029 | 1/1988 | Morino | 364/709 |

FOREIGN PATENT DOCUMENTS

| | | | |
|---|---|---|---|
| 0153465 | 11/1981 | Japan | 364/706 |
| 0122560 | 12/1982 | Japan | 364/706 |
| 0122561 | 12/1982 | Japan | 364/706 |
| 0122562 | 12/1982 | Japan | 364/706 |
| 0122459 | 6/1985 | Japan | 364/706 |
| 0186928 | 9/1985 | Japan | 364/706 |

Primary Examiner—Gareth D. Shaw
Assistant Examiner—Viet Nguyen
Attorney, Agent, or Firm—Alan H. Haggard

[57] ABSTRACT

A calculating device is presented which displays a stack containing values most recently calculated and utilized, in accordance with the preferred embodiment of the present invention. The calculating device also displays a label for each value. When a new valve is added to the stack, the stack labels are searched to see if there is a value on the stack having the same label. If so the duplicate value and its label are removed from the stack.

4 Claims, 11 Drawing Sheets

LINE 1 — DOLLARS=73.35
LINE 2 — DTOF=9.68
LINE 3 — FRANCS=1,000.00
DOLLA FRANC DTOF 105 106 107 108 109 110

*FIG 12*

LINE 1 — DTOF=9.68
LINE 2 — FRANCS=1,000.00
LINE 3 — DOLLARS=103.31
DOLLA FRANC DTOF 105 106 107 108 109 110

*FIG 13*

LINE 1
LINE 2
LINE 3 — >DOLLARS=FRANCS/DTOF
CALC EDIT DELET 105 106 107 108 109 110

*FIG 14*

LINE 1
LINE 2 — DOLLARS=FRANCS/DTOF
LINE 3 — >_
CALC EDIT DELET 105 106 107 108 109 110

*FIG 15*

HISTORY STACK

BACKGROUND

Typically in calculating devices only a single unlabeled value is displayed. A user of the calculator is then forced to keep in his head or by some other means previously calculated or utilized values and their relevance.

SUMMARY OF THE INVENTION

In accordance with the preferred embodiment of the present invention, a algebraic calculating device is presented which displays a stack which contains values most recently calculated or utilized. The stack also contains a label for each value. Labels are displayed by the calculating device concurrently with values. When a new value is added to the stack, the labels in the stack are searched to see if there is a value on the stack having the same label. If so the duplicate value and its label are removed from the stack.

BRIEF DESCRIPTION OF THE DRAWINGS

FIGS. 4–24 show various outputs on a display of the calculating device shown in FIG. 1.

DESCRIPTION OF THE PREFERRED EMBODIMENT

Figure 1:
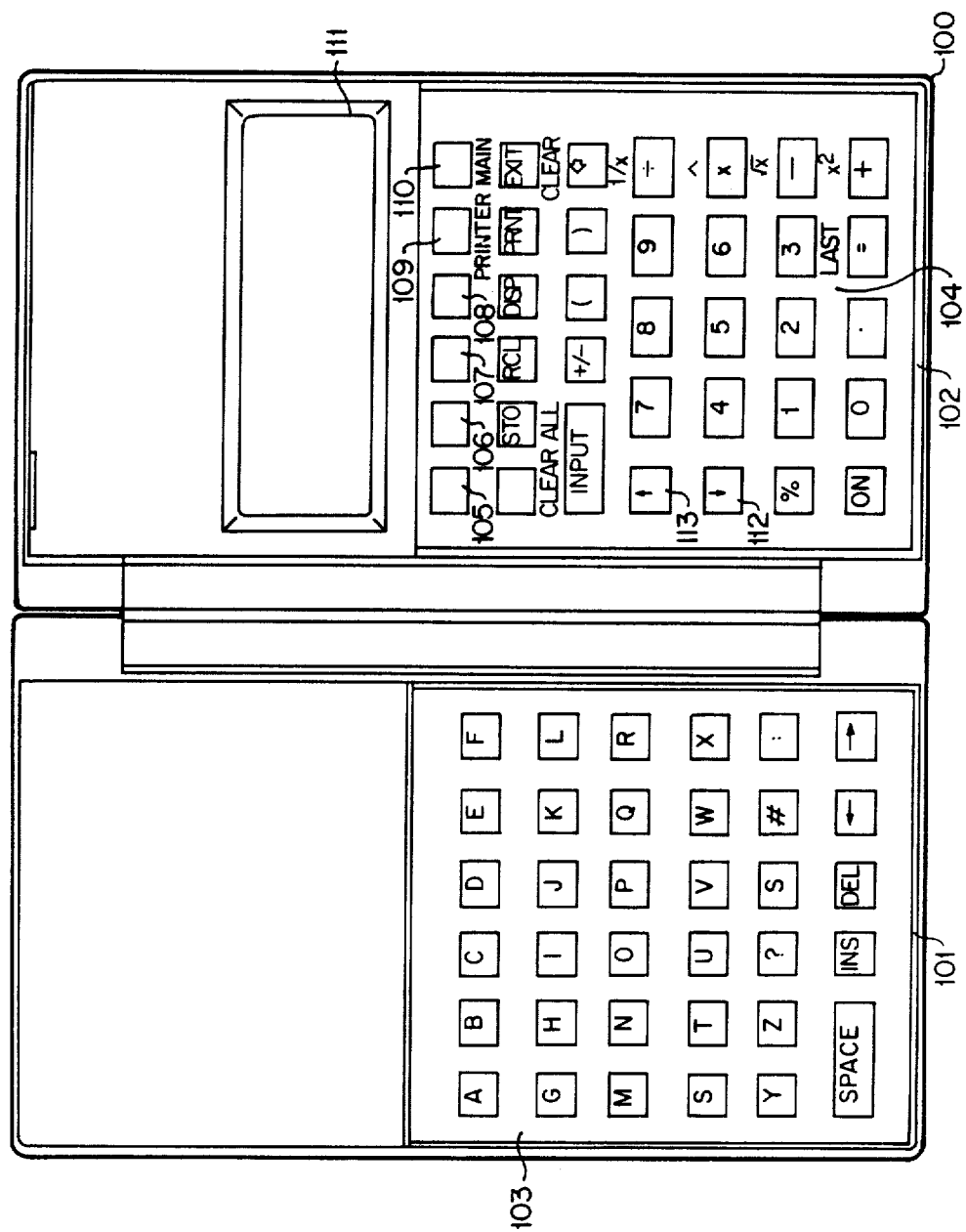
FIG. 1 shows the keyboard and display of a calculating device in accordance with a preferred embodiment of the present invention.

In FIG. 1, a calculating device 100 is shown having a first section 101 and a second section 102. First section 101 includes a plurality of keys 103 which include keys to be utilized for entering alphabetical symbols.

Second section 102 includes a display 111. In the preferred embodiment display 11 is a liquid crystal display which displays four lines of twenty-three characters. Second section 102 also contains a plurality of keys 104, which include numeric keys and function keys are labelled. A scrolling key 112 and a scrolling key 113 are labelled as shown.

Additionally, second section 102 includes a multifunction key 105, a multifunction key 106, a multifunction key 107, a multifunction key 108, a multifunction key 109 and a multifunction key 110. Multifunction keys 105–110 are variable function keys which may have associated with them a function or the value of a variable. The term "key" is used generically to mean a means of entering data. For instance, the term key includes not only mechanical means of input but also may include entry of data through a touch sensitive screen.

Figure 3A:
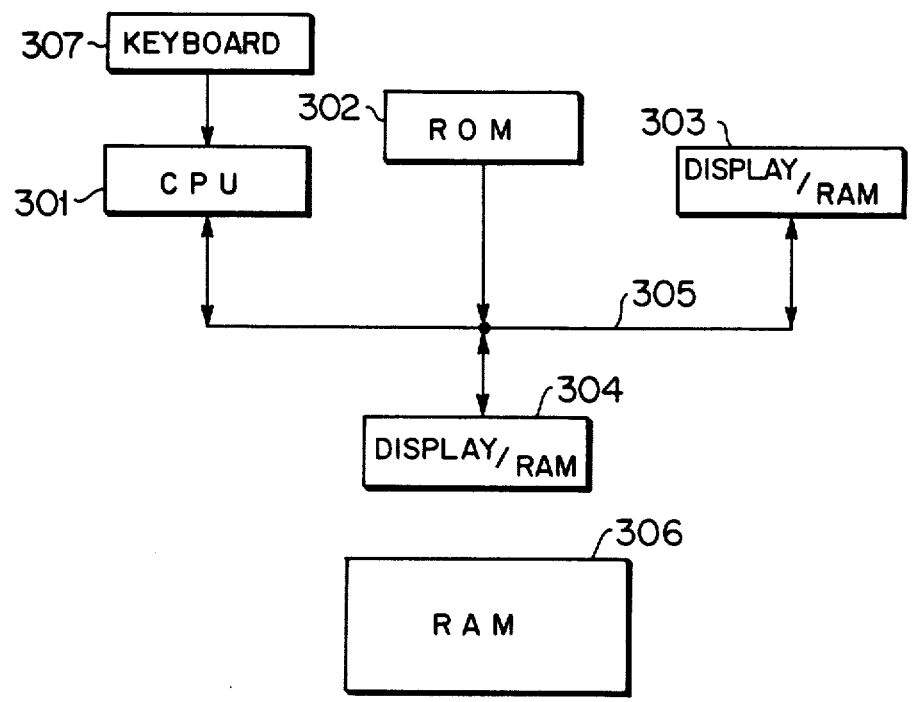
FIG. 3A shows the internal chip-level architecture of the calculating device shown in FIG. 1.

FIG. 3A shows the internal chip-level architecture of calculating device 100. A central processing unit (CPU) 301, a read only memory (ROM) 302, a combination display controller and a random access memory (Display/RAM) 303 and a Display/RAM 304 are shown coupled to a bus 305. A keyboard 307 is shown coupled to CPU 301. Keyboard 307 may include plurality of keys 103 and plurality of keys 104. A random access memory (RAM) 306 is also shown in FIG. 3A. RAM 306 is the total RAM from Display RAM 303 and Display RAM 304 which is available to be accessed by CPU 301.

Figure 3B:
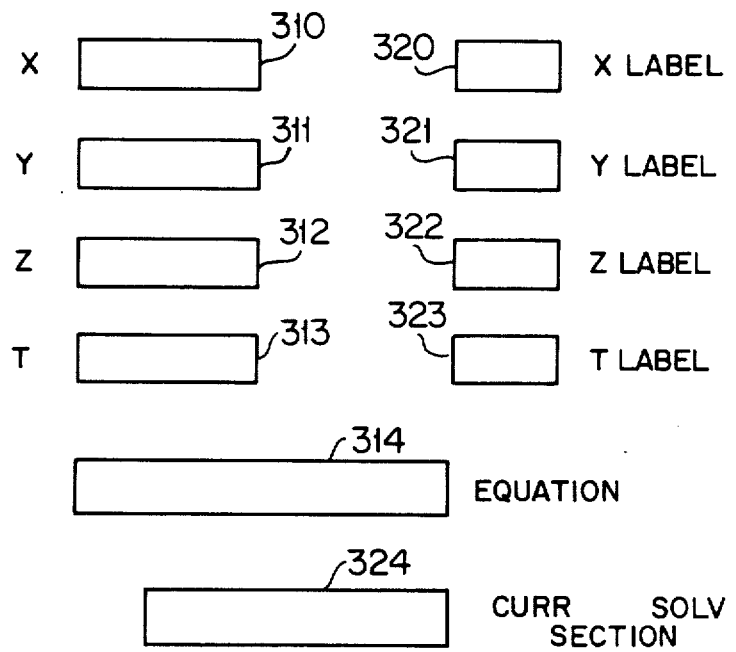
FIG. 3B, and 3C show memory configuration of the calculating device shown in FIG. 1.

FIG. 3B shows a memory location 310, a memory location 311, a memory location 312, a memory location 313, a memory location 320, a memory location 321, a memory location 322, a memory location 323, a memory location 314 and a memory location 324. Memory locations 310–314 and 320–324 are permanently assigned memory locations within RAM 306. Memory locations 310–313 each contain 64-bit binaryencoded decimal numbers. Memory locations 314, and 320–324 each contain 20-bit addresses that point to other memory locations in RAM 306. Memory locations pointed to by memory locations 320–323 contain alphanumeric strings. Display 111 displays alphanumeric strings pointed to by memory locations 320–322 and 64-bit arithmetic numbers contained in memory locations 310–312. In display 111 the alphanumeric string pointed to by 320 (called "XLABEL") is displayed adjacent to the ASCII form of the number stored in memory location 310 (called "X"). Similarly, the alphanumeric string pointed to by 321 (called "YLABEL") is displayed adjacent to the ASCII form of the number stored in memory location 311 (called "Y"), and the alphanumeric string pointed to by 322 (called "ZLABEL") is displayed adjacent to the ASCII form of the number stored in memory location 312 (called "Z").

X, Y, and Z with their associated labels are treated as a stack. Memory location 313 (called "T") and memory location 323 (called "TLABEL") are the top of the stack and are not displayed. X,Y,Z and T and their associated labels may contain the nothing. FIG. 2C is a flowchart of a program for adding and deleting entries from the stack. Additional details about the stack performance is evident from the discussion below.

Memory location 314 and memory location 324 are also permanently assigned memory locations. Memory location 314 contains the null set or a 20-bit address of alphanumeric string which is used as a current equation, as explained below. Memory location 324 contains the null set or a twenty-bit address of a memory location containing the parsed version of the alphanumeric string pointed to by memory location 314, as explained below.

Figure 2A:
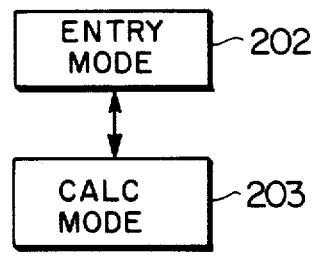
FIG. 2A is a block diagram of a program implementing an equation solving interface in accordance with the preferred embodiment of the present invention.

FIG. 2A is a block diagram of a program implementing an equation solving interface. The program can be in an entry mode 202 or a calculating mode 203. In entry mode 202 plurality of keys 103 and 104 can be used to enter a equation into calculating device 100. The equation is entered as an alphanumeric string pointed to by memory location 314. More discussion on exactly how to enter an equation and how an equation is displayed by display 111 is found below.

Once an equation has been entered into calculating device 100, a user may enter into calculation mode. The actual steps necessary for a user to perform are discussed more fully below. Calculating device 100 parses the equation displayed by display 111 in order to extract mathematical variables and to determine the mathematical relationship between the variables. Also, calculating device 100 verifies that the entered equation does define a legitimate mathematic relationship. A parsed version of the alphanumeric equation shown by display 111 is placed in a memory location pointed to by equation 324. Parsing is well-understood in the art, and a discussion thereof may be found, for instance in *Principles of Compiler Design*, Alfred V. Aho, Jeffrey D. Ullman, Addison-Wesley Publishing Company, 1977, esp. Chapters 3,4,5.

Figure 3C:
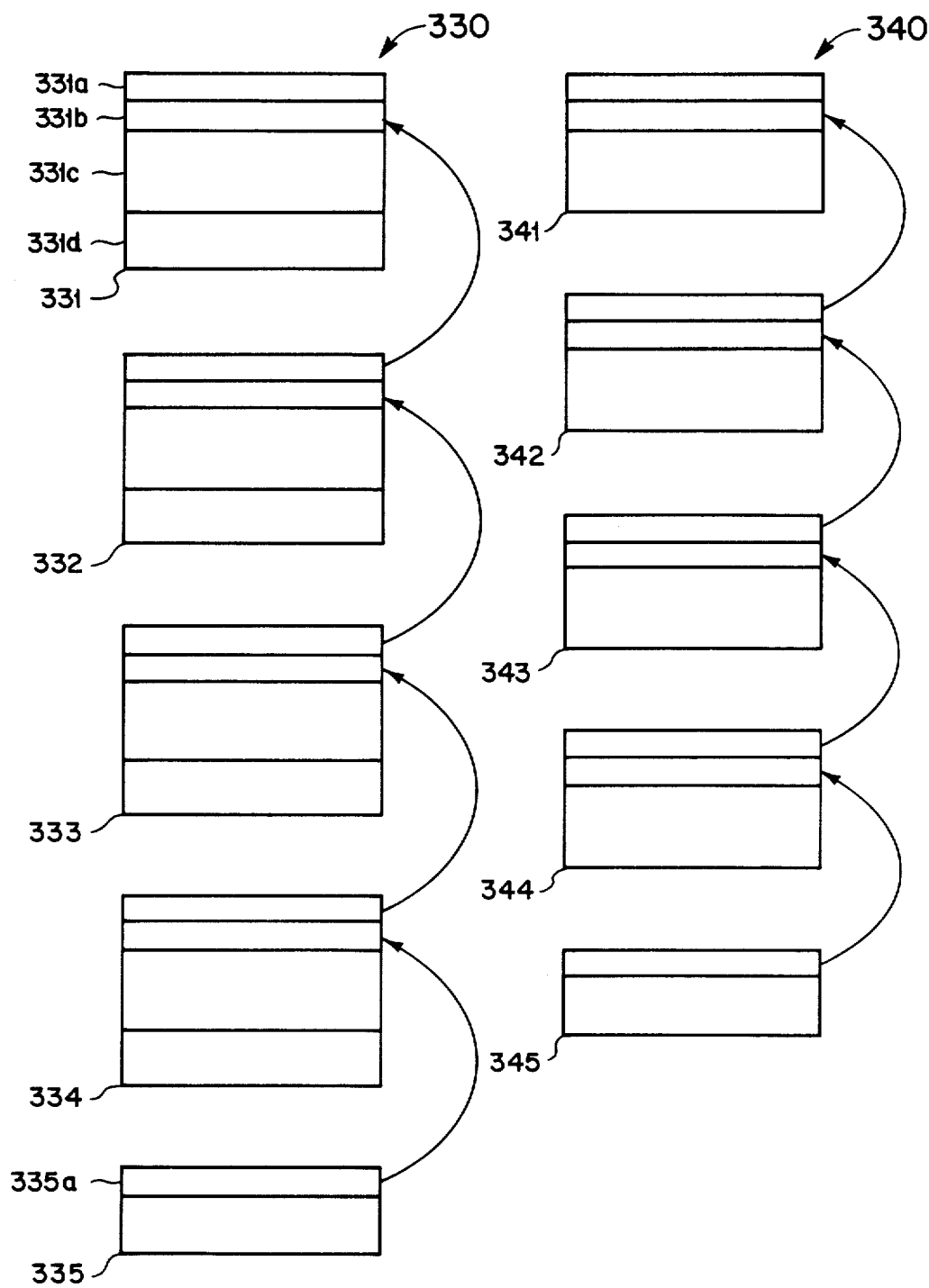

When parsing the equation, calculating device 100 extracts the variables and compares the variables to variables in a variable list 330 (sometimes referred to herein as "the variable list"), shown in FIG. 3C. Variable list 330 is a linked list in which each variable location includes a pointer to the next variable in the list. Variable list 330 resides in RAM 306. Variable list 330 is shown to have entries 331, 332, 333, 334 and top of list 335. Entry 331 is shown divided into four segments. A segment 331a contains a twenty-bit address of the next entry into variable list 330, or the null set if there is no exit entry. A segment 331c contains an alphanumeric variable name. A segment 331b contains the length of the alphanumeric variable name contained in segment 331c. A segment 331d contains a 64-bit number representing the current value of the variable of entry 331. Entries 332-334 are formatted similarly to entry 331. Entry 335 is a top of stack pointer and contains a segment 335a which points to entry 334.

If after parsing, an equation is verified to be of appropriate format, the equation, in unparsed form, is placed in a formula list 340 (sometimes referred to herein as "the formula list") which stores equations. Formula list 340 is shown to have entries 341, 342, 343, 344 and top of list 345. Entry 341 is shown divided into three segments. A segment 341a contains a twenty-bit address of the next entry into formula list 340, or the null set if there is no next entry. A segment 341c contains the equation in unparsed form. A segment 341b contains the length of the equation contained in segment 341c.

Once in calculating mode the equation to be calculated is displayed by display 111. Additionally, each variable of the equation is associated with one of the multifunction keys 105-110. For each variable associated with a multifunction key a label with the name of the variable appears on display 111 right above the multifunction key associated with the variable, as further described below.

Figure 2B:
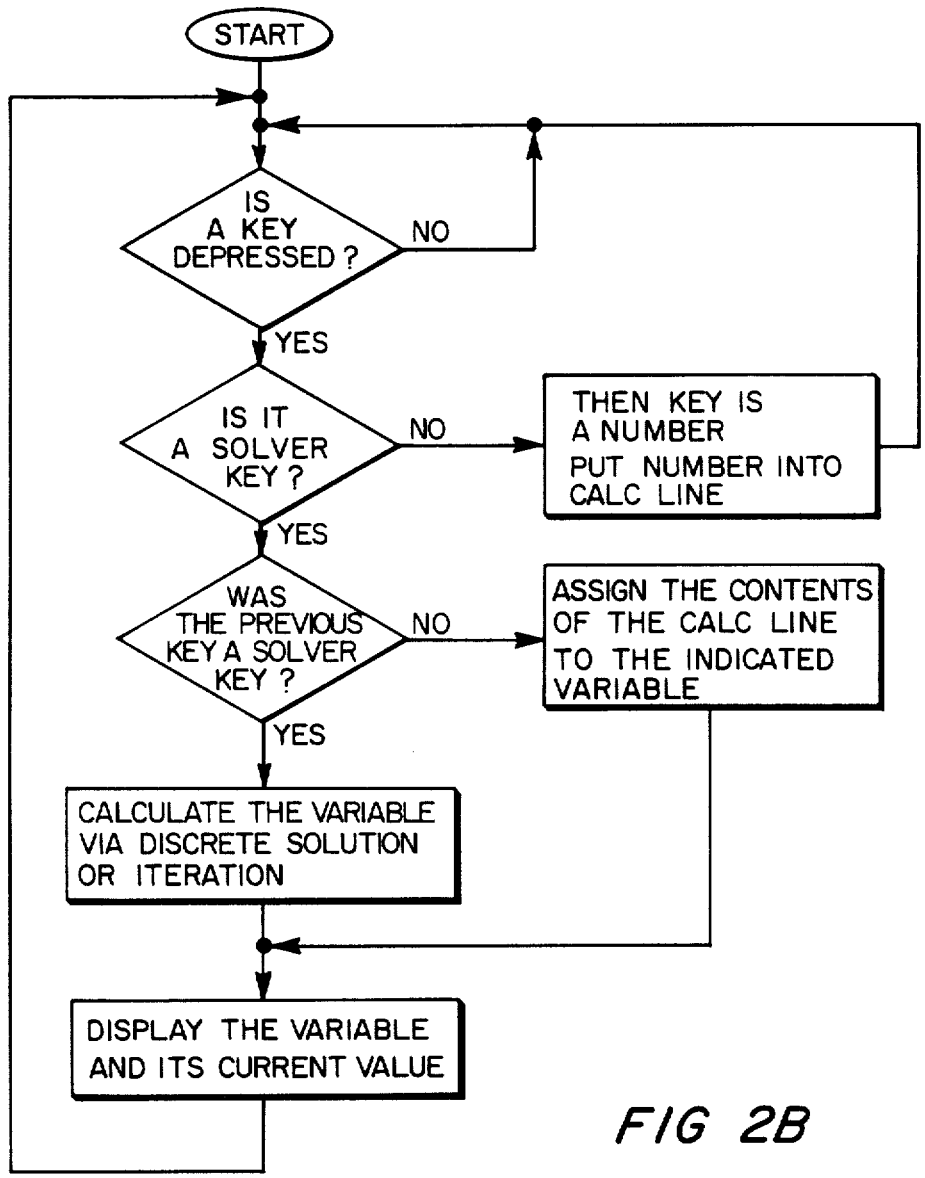
FIG. 2B is a flowchart of a program which implements the the calculating portion of the equation solving interface shown in FIG. 2A.
Figure 2C:
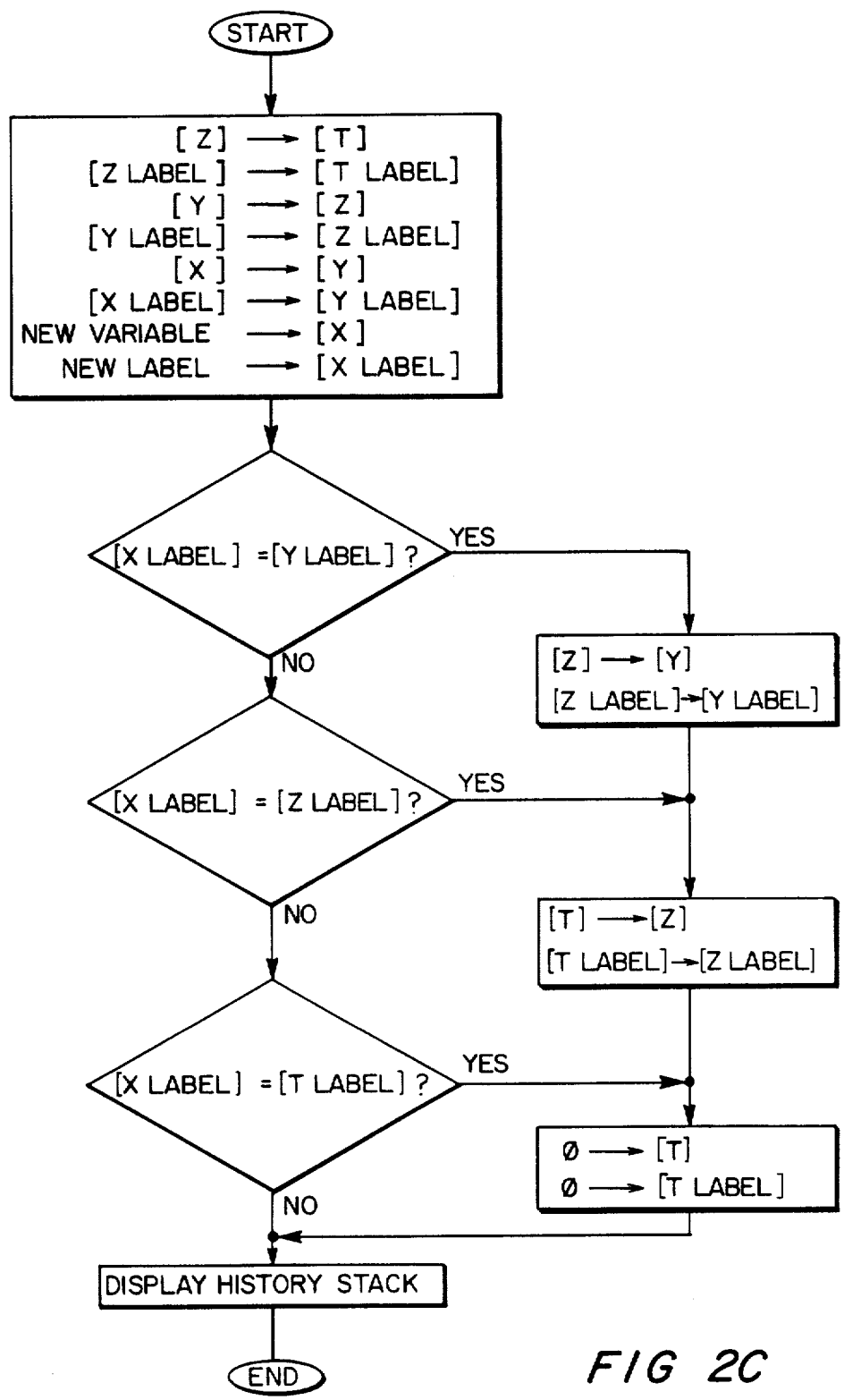
FIG. 2C is a flowchart of a program which shows how new variables are added to a history stack.

Calculating device 100 when in calculating mode enters the programming loop described by the flowchart shown in FIG. 2B. A monitor loops until a key on calculating device 100 is depressed. Once a key is depressed calculating device 100 checks to see if it was one of multifunction keys 105-110. If the key depressed is not one of multifunction keys 105-110, calculator 100 enters the value, into a current calculate line, as described further below. The calculator then reenters the monitor loop.

If the key depressed is one of multifunction keys 105-110, calculator 100 checks to see whether the last prior key depressed was from multifunction keys 105-110. If the last prior key depressed was not from multifunction keys 105-110, the value in the calculator line is entered into a variable associated with the multifunction key depressed. The variable and its current value is then displayed.

If the last key depressed was from multifunction keys 105-110, the variable of the currently depressed multifunction key is calculated using the values of the other variables. The variable calculated and its current value is then displayed.

The following is a hands-on description of the interface which serves to illustrate the details of function of calculating device 100.

Figure 4:
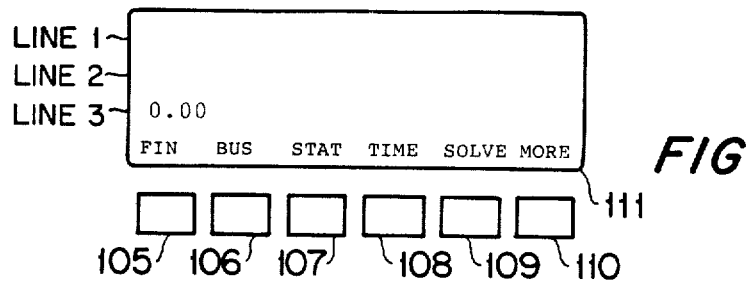

Display 111 is shown in FIG. 4. Calculating device 100 is in a condition such that no equations have been entered into formula list 340. In FIG. 4, display 111 shows the main menu of calculating device 110. Display 111 is set to round to two decimal places.

Figure 5:
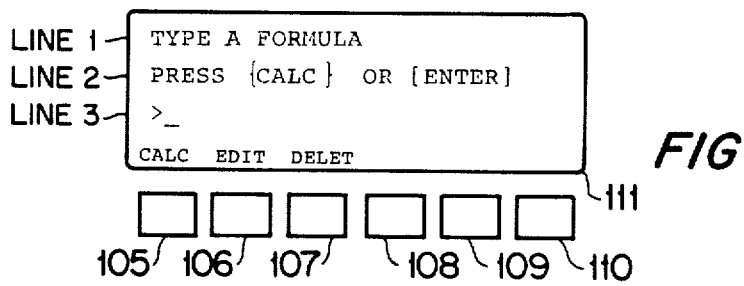

To enter the SOLVE application, press [(SOLVE)]. What is meant by "press [(SOLVE)]" is to press a multifunction key from multifunction keys 105-110 which is immediately below the label SOLVE in display 111. As shown in FIG. 4, this would mean depressing multifunction key 109. In the following, a variable name surrounded by "[()]" means that the variable may be selected by depressing one of multifunction keys 105-110. A name surrounded by "[]" means that the function may be selected by depressing one of plurality of keys 103 or 104 which is thus labelled. If there are not formulas in formula list 340 when you press [(SOLVE)], FIG. 5 shows what will be seen.

THE GENERAL PROCEDURE

The general procedure is given below:

Type in a formula.

Press [(CALC)] to calculate using the variables in the formula in the top-row-keys interface.

Press [EXIT]to return to the SOLVE menu.

Type in another formula.

Press [(CALC)] to calculate using the second formula.

And so forth . . .

PUTTING THE FIRST FORMULA INTO FORMULA LIST 340

Figure 6:
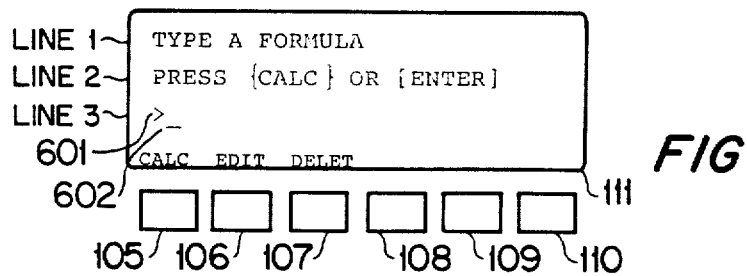

Suppose that display 111 is as shown in FIG. 6. The calculator line is in alphanumeric mode and the calculator history stack described in FIG. 3B is masked and can not be seen. A pointer (bold arrow) 601 points to the current formula. A cursor 602 is to the right of pointer 601, indicating the beginning of the formula that you will type in.

The [EXIT]key, shown labelled in FIG. 1, has either of two effects in the SOLVE menu if the cursor is on:

If formula list 340 is empty, the main menu returns.

If formula list 340 is not empty, the SOLVE menu remains, the edit line disappears, and the previous current formula returns as the current formula.

Let us presume that you wish to enter the following monetary conversion formula into formula list 340 and to calculate the number of French francs that are equivalent to $73.35 if the conversion rate is 9.68 French francs to 1 U.S. dollar.

Formula: DOLLARS=FRANCS/DTOF (DTOF is francs-to-dollar rate).

Figure 7:
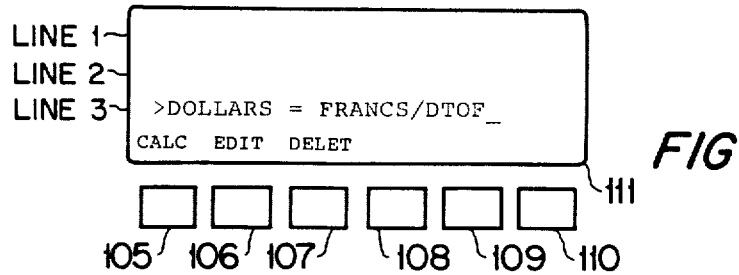

The procedure is to type in a formula and to press [(CALC)]. In this procedure, after you type in the formula completely, but before you press [(CALC)], display 111 will display as seen in FIG. 7. In this embodiment a variable name must begin with a alphabetic character and cannot contain the characters that are arithmetic operators.

If the formula is more than 22 characters long, the formula scrolls up to line 2, with the continuation in line 3, with no indentation.

You can uses spaces between variables and operators, but you can not put spaces within a variable name. Spaces in a valid formula are retained in formula list 340. There are no implied operators. Thus, A(B+1)=X is not valid

CALCULATING USING THE FORMULA

Figure 8:
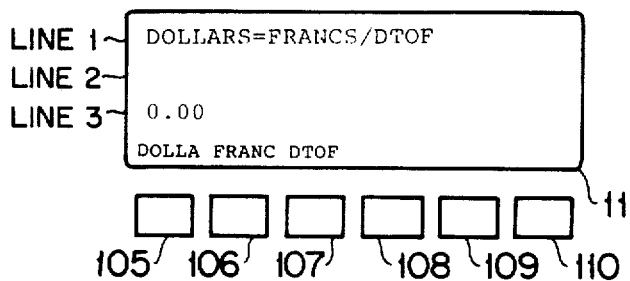

Now that you have completed typing in the formula, press [(CALC)] and display 111 will appear as shown in FIG. 8.

The formula is entered into formula list 340 and placed into line 1, indented one space. The calculator line is active. As you calculate and store numbers and the history stack lifts, the formula in line 1 disappears (see flowchart in FIG. 2C).

Variable in the formula that do not already exist are created and initialized to zero. The variables will exist in variable list 330 and consume space in RAM 306 until the variables are deleted using either the [(delete)] or [shift] [CLEAR ALL] keys.

Having pressed [(CALC)], the menu key labels display the first four or five characters of the variable names in the formula, depending on the characters used, in the order in which they appear in the formula. You are now able to calculate using these menu keys.

While the formula is being interpreted after you press [(CALC)], display 111 displays the message "VERIFYING FORMULA" in line 1.

If the formula is not valid, the error message "INVALID FORMULA" is displayed and the cursor is placed over the character that is detected as causing the error. You can edit the formula to correct it. If there is more than one error in the formula, the errors are detected one at a time, as you correct them and press [(CALC)].

Figure 9:
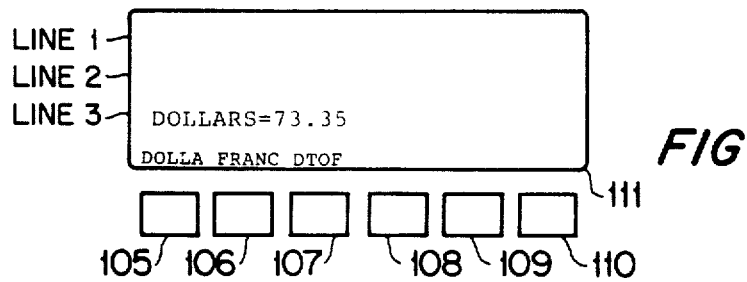

To calculate the answer to the example above, key in 73.35 and press [)COLLA)] and display 111 will appear as shown in FIG. 9.

The three lines again display the stack and the formula is no longer displayed.

Figure 10:
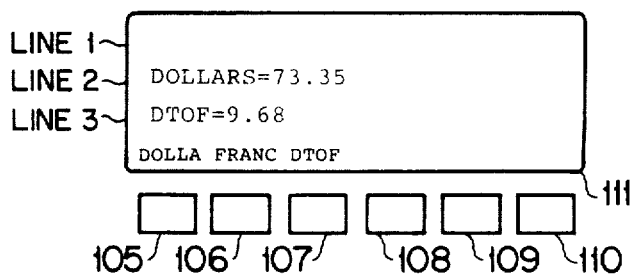

Key in 9.68 and press [(DTOF)] and display 111 will appear as shown in FIG. 10.

Figure 11:
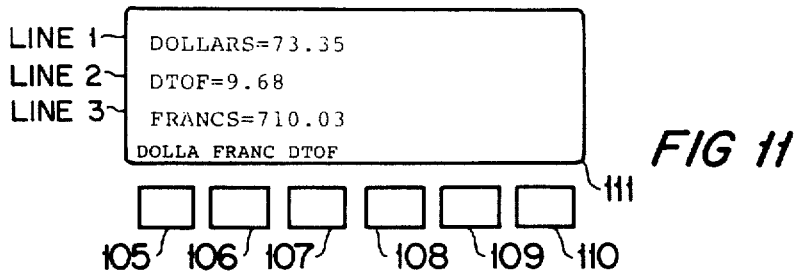

To solve for the number of French francs, press [(FRANC)]and display 111 will appear as shown in FIG. 11.

The calculator solves for the variable FRANCS and displays the answer. While it is solving for a variable, you will see "CALCULATING . . . " in line 1.

If the price of a sweater is 1000 francs, you can easily calculate the equivalent in U.S. dollars. Directly from the previous display, key in 1000 and press [(FRANC)] and display 111 will appear as shown in FIG. 12.

Then press [(DOLLA)] and display 111 will appear as shown in FIG. 13.

You can press [shift] [MAIN] to leave SOLVE and return to the main menu. The history stack would still be displayed as seen above, but the menu keys would show the main menu labels.

You can also press [EXIT] to return to the SOLVE menu so that other formulas can be typed into formula list 340.

In either case, the numbers that are now stored in the machine as values for DOLLARS, FRANCS, and DTOF are retained in memory for you to use when you return to this formula in SOLVE. The values for the variables will default to zero if you change the formula.

Although it is not necessary for you to do so, if you wish to clear the values for these variables to zeroes, press [shift][CLEAR ALL] at any time you are in the CALC menu.

The present embodiment returns solution using both numeric and symbolic methods. Future embodiments still being developed will utilize the symbolic method to return not only a value, but other types of data as well.

PUTTING ADDITIONAL FORMULAS INTO THE FORMULA LIST

It is quite easy to put additional formulas into formula list 340 following the formula that you are working on. Suppose that you wish to put in two additional formulas: DOLLARS=LIRE/DTOL for conversion between U.S. dollars and Italian lire, and DOLLARS=-POUNDS/DTOP for conversions between U.S. dollars and British pounds.

To do so, press [EXIT] to return to the SOLVE menu. Display 111 will appear as shown in FIG. 14.

This display again masks the calculator history stack you saw in the CALC display previously.

The bold arrow pointing at the dollars/francs conversion formula indicates that it is the current formula in formula list 340. This display indicates that the current formula is at the top of formula list because there is no other formula shown above it in display 111; lines 1 and 2 are blank. (We will see something there after we type in other formulas).

If you press [shift] [CLEAR ALL] with this display, you get a display that shows two options concerning clearing formula list 340.

Press [v] (labelled as key 112 in FIG. 1) and display 111 will appear as shown in FIG. 15.

This display indicates that the dollars/francs formula is also the last formula in formula list 340, since there is no current formula (no bold arrow pointing at a formula) and the cursor is blinking at the left of line 3, indented one space.

If you were to press [(CALC)] with the blank line at the pointer, nothing happens.

Figure 16:
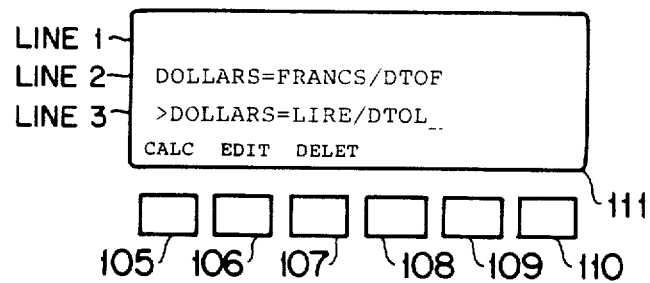

With the blinking cursor in this position, you can begin typing in a formula as the next formula in formula list 340. Display 111 as shown in FIG. 16 shows what you will see if you now type in the dollars/lire conversion formula.

Figure 17:
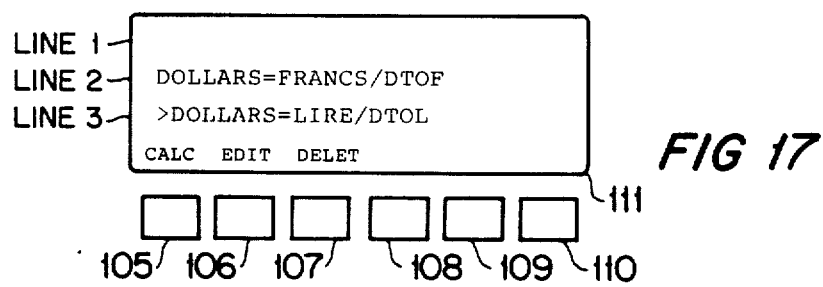

You can now press [(CALC)] and calculate using the formula. However, let us enter the formula without calculating so that a third formula can be typed in. To do after you type the second formula, press [INPUT], which enters the formula into formula list 340 but does not go to the CALC menu, as does [(CALC)]. So, press [INPUT] and display 111 will appear as shown in FIG. 17.

Now you see the first formula in line 2 and the second formula as the current formula in line 3.

The bold arrow is a pointer to the current formula; the pointer stays in line 3. The other lines are a window over the preceding two formulas in formula list 340. At this time there is only one other formula, thus line 1 is blank.

Figure 18:
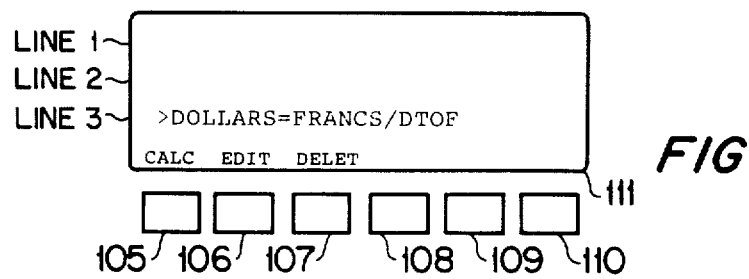

Since dollar/lire formula is the last formula in formula list 340, you could press [v] to move the pointer from the current formula to add the third formula to the end of formula list 340. However, in order to demonstrate the automatic insert feature of the SOLVE enter/edit mode, press [ ↑ ] (labelled as key 113 in FIG. 1) to make the first formula the current formula. Display 111 will appear as shown in FIG. 18.

Now the first formula is the current formula and the menu keys would show its variables if [(CALC)] were pressed.

We know also that the second formula is below it in formula list 340, but it is not seen.

We have the dollars/pounds conversion formula to put into formula list 340. Let us suppose that, rather than putting it at the bottom of formula list 340, we wish to insert it between the dollars/francs and the dollars/-lire formulas now in formula list 340. To do so with display 111 as shown in FIG. 18, merely start typing!

Figure 19:
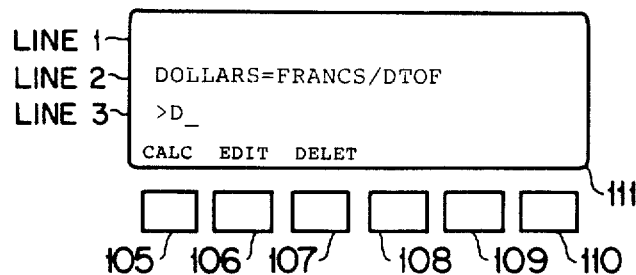

Type the first character, [D], and display 111 will appear as shown in FIG. 19.

The current formula automatically moves up to line 2, the character you typed appears at the left of line 3, and the blinking cursor is to its right. You are typing the formula in and it will be placed between the two formulas now in formula list 340—automatically. Complete the typing of the formula and press [INPUT] or [(CALC)]. The formula will be entered and become the current formula.

Figure 20:
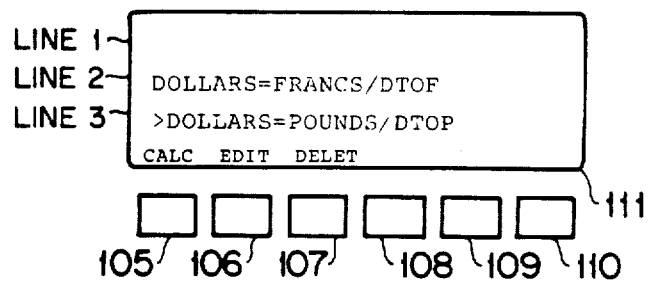

If you finish typing the dollars/pounds formula and press [INPUT], display 111 will appear as shown in FIG. 20.

Figure 21:
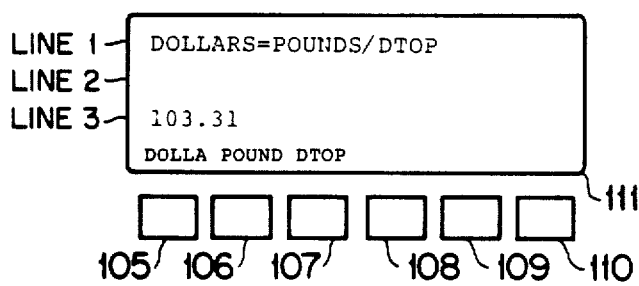

If you had pressed [(CALC)] before pressing [INPUT], or if you press [(CALC)] now, display 111 will appear as shown in FIG. 21.

The variables in the current formula appear as the menu keys, the calculator history stack returns with the current formula in line 1, and the previous contents of the calculator line return undisturbed.

In CALC mode, the [↑] and [v] keys roll the history stack. If you wish to change formulas, press [EXIT] to return to the SOLVE menu. In that menu, the [↑] and [v] keys move up and down in formula list 340.

Figure 22:
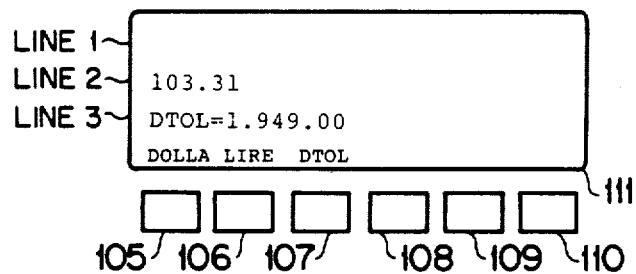

If you move to another formula, the formulas share variables of the same name. Thus, the three conversion formulas in formula list 340 share the variable named DOLLARS. In the present example dollars has the value 103.31. Suppose that the dollars/lire formula is the current formula in CALC mode and the variables in the dollars/francs formula have not been cleared. If the conversion of lire to dollars is 1949 lire to $1, you can calculate the lire equivalent to $103.31 at this time by keying in 1949 and pressing [(DTOL)] and display 111 will appear as shown in FIG. 22.

Figure 23:
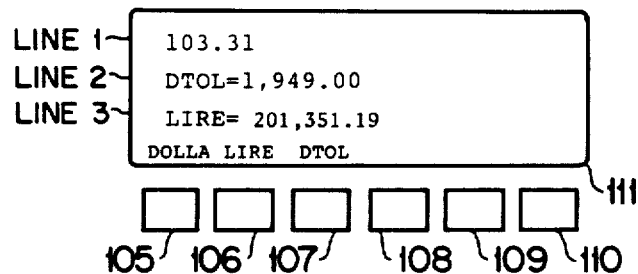

Then pressing [(LIRE)], and display 111 will appear as shown in FIG. 23.

Figure 24:
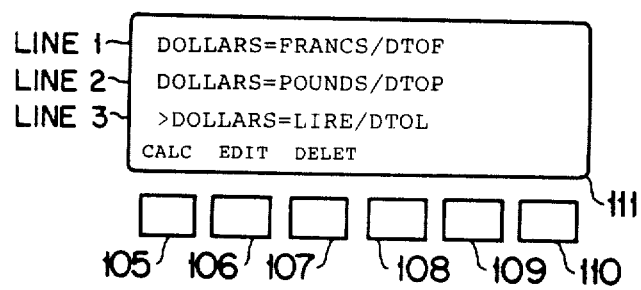

Press [EXIT] to return to the SOLVE menu and display 111 will appear as shown in FIG. 24.

The dollars/lire conversion formula is shown as the current formula and the other two formulas in formula list 340 at this time are shown above it. You can immediately begin typing another formula (which would be inserted after the current formula), or press [v] to find the bottom of formula list 340. If you press [shift] [v] the pointer will be placed just past the last formula in formula list 340. You could also press [(CALC)] again to continue calculating with the current formula.

You could press either of the other two menu keys in the SOLVE menu. The remainder of this chapter explains the features of these keys.

The following is a brief description of the function of each of the menu keys:

CALC -- brings up the current formula variables as menu keys for calculation.

EDIT -- puts the current formula into edit mode.

DELET -- deletes the current formula (no insert is needed, since it is automatic; see the previous section).

We claim:

1. In a calculating device an improvement comprising: value storing means for storing a plurality of values;
    label storing means for storing a label for each value in the plurality of values;
    display means for displaying a first value from the plurality of values and a first label, the first label being a label for the first value;
    value entry means for causing the display means to display a new value and a new label, the new label being a label for the new value, wherein the value entry means compares the first label to the new label and causes the display means to display the new value and the new label simultaneous to the displaying of the first value and the first label when the first label is different than the new label, and wherein the value entry means causes the display means to display the new value and the new label but not the first value and the first label when the first label is the same as the new label.

2. In a calculating device an improvement comprising:
    value storing means for storing a plurality of values;
    label storing means for storing a label for each value in the plurality of values;
    display means for simultaneously displaying the plurality of values and the plurality of labels.

3. In a calculating device an improvement comprising:
    display means for displaying in plurality of values and a plurality of labels, wherein each value in the plurality of values i associated with a label in the plurality of labels; and,
    value entry means for causing the display means to display a new value not in the plurality of values and a new label, wherein the value entry means compares the new label to each label in the plurality of labels and causes the display means to display the new value and the new label simultaneous to the displaying of at least one of the values from the plurality of values and its associated label from the plurality of labels when the new label is different from each of the labels in the plurality of labels, and wherein the value entry means causes the display means not to display a first label from the plurality of labels and a first value associated with the first label when the first label is the same as the new label.

4. In a calculating system, a method for displaying labels and values for a plurality of variables, the method comprising the steps of:
    (a) displaying a label and a value for a plurality of the variables simultaneously; and,
    (b) when a first variable is assigned a new value performing, the following substeps:
        (b.1) when a first label and an old value for the first variable are being displayed, ceasing display of the first label and the old value, and
        (b.2) displaying the first label and the new value.

* * * * *